(12) United States Patent
Nonomura

(10) Patent No.: US 9,829,571 B2
(45) Date of Patent: Nov. 28, 2017

(54) RANGE FINDER AND OPTICAL DEVICE

(71) Applicant: NIKON VISION CO., LTD., Tokyo (JP)

(72) Inventor: Takehito Nonomura, Nishitama-gun (JP)

(73) Assignee: NIKON VISION CO., LTD., Tokyo (JP)

( * ) Notice: Subject to any disclaimer, the term of this patent is extended or adjusted under 35 U.S.C. 154(b) by 0 days.

(21) Appl. No.: 15/443,454

(22) Filed: Feb. 27, 2017

(65) Prior Publication Data

US 2017/0234975 A1 Aug. 17, 2017

Related U.S. Application Data

(63) Continuation of application No. PCT/JP2014/004400, filed on Aug. 27, 2014.

(51) Int. Cl.
  *G01S 7/486* (2006.01)
  *G01S 17/10* (2006.01)
  *G01S 7/484* (2006.01)
  *G01S 7/481* (2006.01)

(52) U.S. Cl.
  CPC ............ *G01S 7/4865* (2013.01); *G01S 7/484* (2013.01); *G01S 7/4811* (2013.01); *G01S 17/10* (2013.01)

(58) Field of Classification Search
  CPC .................................................... G01S 7/4865
  See application file for complete search history.

(56) References Cited

U.S. PATENT DOCUMENTS

| 6,862,084 | B2 | 3/2005 | Nagata et al. |
| 8,831,908 | B2 | 9/2014 | Kamitani et al. |
| 9,494,687 | B2* | 11/2016 | Ell ........................ F41G 7/008 |
| 2015/0362585 | A1* | 12/2015 | Ghosh .................. G01S 7/4815 250/208.1 |
| 2016/0363668 | A1* | 12/2016 | Xu ........................ G01S 17/107 |
| 2017/0045358 | A1* | 2/2017 | Masuda ................... G01C 3/06 |

FOREIGN PATENT DOCUMENTS

| JP | H06-308234 A | 11/1994 |
| JP | H10-253760 A | 9/1998 |
| JP | 2004-101342 A | 4/2004 |
| JP | 2011-215005 A | 10/2011 |

OTHER PUBLICATIONS

Nov. 18, 2014 Search Report issued International Patent Application No. PCT/JP2014/004400.
Feb. 28, 2017 International Preliminary Report on Patentability issued in International Patent Application No. PCT/JP2014/004400.

* cited by examiner

*Primary Examiner* — WB Perkey
(74) *Attorney, Agent, or Firm* — Oliff PLC

(57) ABSTRACT

A distance detection apparatus includes: a detection unit which detects a time until when an output light is received by a light receiving unit; a computation unit which computes a distance to a detection target by using the time detected by the detection unit; an obtaining unit which obtains a predetermined range which is a range prone to a detection error due to a fog; and a determination unit which determines whether the distance to the detection target computed by the computation unit is included in the predetermined range.

14 Claims, 15 Drawing Sheets

RANGE FINDER AND OPTICAL DEVICE

BACKGROUND

1. Technical Field

The present invention relates to a distance detection apparatus and an optical device.

2. Related Art

There is a range finder which measures a distance to a target based on a propagation time of a measurement light reflected on the target (for example, refer to Patent Document 1).

[Patent Document 1] Japanese Patent Application Publication No. 2004-101342

There is a problem of displaying an erroneous result of ranging if fogs or mists occur between the range finder and the target and a reflected light from the fogs or the mists is incorrectly recognized as a reflected light from the target.

SUMMARY

Therefore, in one aspect of the technical breakthrough (innovation) included herein, the purpose is to provide a distance detection apparatus and an optical device to solve the problem described above. This purpose is achieved by a combination of the claimed features. That is, in a first aspect of the present invention, provided is a distance detection apparatus comprising: a detection unit which detects a time until when an output light is received by a light receiving unit; a computation unit which computes a distance to a detection target by using the time detected by the detection unit; an obtaining unit which obtains a predetermined range which is a range prone to a detection error due to a fog; and a determination unit which determines whether the distance to the detection target computed by the computation unit is included in the predetermined range.

In a second aspect of the present invention, provided is an optical device including the distance detection apparatus described above.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention is described through the embodiments. The following embodiments do not limit the invention according to the claims, and all the combinations of the features described in the embodiments are not necessarily essential to means provided by aspects of the invention.

Figure 1:
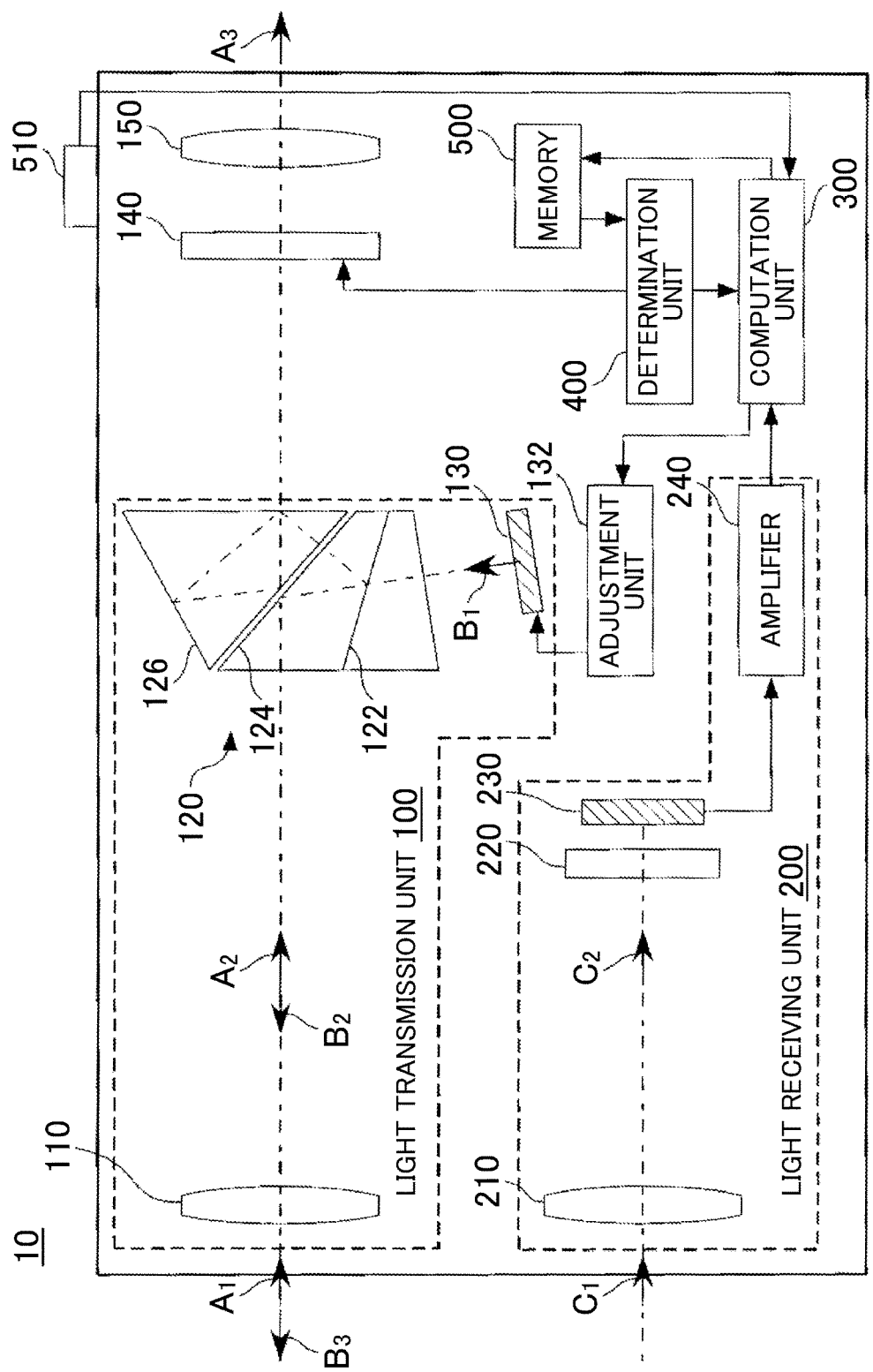
FIG. 1 is a block diagram of a range finder in a first embodiment.

FIG. 1 is a block diagram of a range finder 10 in a first embodiment. The range finder 10 includes a light transmission unit 100, an adjustment unit 132, a light receiving unit 200, a computation unit 300, a determination unit 400 and a memory 500. The range finder 10 further includes a reticle plate 140, an eye lens 150 and a manipulation button 510.

The light transmission unit 100 outputs a measurement light to a target. The light transmission unit 100 includes an object lens 110, an erect prism 120 and a light emitting unit 130. In the following description, a direction in which the light transmission unit 100 in the range finder 10 outputs a measurement light, that is, arrow direction of a light beam $B_3$ in the figure, is referred to as a forward direction.

The light emitting unit 130 outputs a pulse-like measurement light at a constant time interval. In this case, the light emitting unit 130 outputs, in one ranging operation, the predetermined number of pulse lights per second, for example, 320 pulse lights per second. One example of the light emitting unit 130 is a semiconductor laser oscillating an infrared light. Hereinafter, the description is provided using an example in which the light emitting unit 130 outputs a measurement light in the infrared region.

The erect prism 120 includes a dichroic reflection surface 122 which reflects a light of the visible light band and allows a light of the infrared band to be transmitted therethrough, and total reflection surfaces 124, 126 having a high reflection ratio against both of the visible light band and the infrared band. In the erect prism 120, the measurement light is transmitted through the dichroic reflection surface 122, reflected on the total reflection surface 124, and propagated forward within the range finder 10, as a light beam $B_2$. Further, the erect prism 120 inverts an inverted reflection image formed by an incident light beam to an erect image, by using the dichroic reflection surface 122, the total reflection surfaces 124, 126 and other reflection surfaces. Examples of the erect prism 120 are Dach prisms, Porro prisms and the like.

The object lens 110 irradiates toward the front side of the range finder 10 a light beam $B_3$ to which the light beam $B_2$ output from the erect prism 120 is collimated.

The adjustment unit 132 adjusts an output timing and an intensity of the measurement light output from the light emitting unit 130.

The object lens 110 described above, the erect prism 120 described above, the reticle plate 140, and the eye lens 150 configure a sighting unit with which a user sights the range finder 10 against a target. That is, the sighting unit shares a part of an optical system with the light transmission unit 100. This allows in the range finder 10, the light transmission unit 100 and the sighting unit have the same optical axis apparently.

The reticle plate 140 is placed at a focal position of the object lens 110. A front end of the eye lens 150 is opposite to a back end of the erect prism 120 inside the range finder 10.

The reticle plate 140 includes a sighting indicator and a display unit. Exemplary shapes of the sighting indicator are cross lines, rectangular frames, circular frames and the like. The sighting indicator may be formed by way of print, etching and the like on a plate which is transparent to a visible light or may be displayed by using a transmissive liquid crystal. The display unit uses a transmissive liquid crystal and the like to display to a user a measurement result of a distance to the target by characters, images and the like. Instead of providing the display unit directly on the reticle plate 140, it may also be configured by a reflective liquid crystal and an optical system which guides an image displayed by using the liquid crystal to the reticle plate 140. The display unit may also display, for example, a remaining amount of a battery, an alert, a clock and the like, in addition to a result of ranging.

Among lights reflected or scattered on the target positioned anterior to the range finder 10, a light beam $A_1$ propagated within a range of a visual angle of the object lens 110 enters the sighting unit. The light beam $A_1$ is collected in the object lens 110, as a light beam $A_2$, and output through the erect prism 120, the reticle plate 140 and the eye lens 150, as a light beam $A_3$ to the hack side of the range finder 10. This allows a user to observe the erect image of the target through the eye lens 150.

On an image of the target which a user observes through the eye lens 150, the sighting indicator arranged on the reticle plate 140 is superimposed. Thus, a user superimposes the sighting indicator on the image to be observed through the eye lens 150 to sight the range finder 10 against the target. In this case, as the light transmission unit 100 and the sighting unit have the same optical axis apparently as described above, the measurement light is irradiated to the position indicated by the sighting indicator.

The light receiving unit 200 receives a back reflected light from the target and outputs a light receiving signal which is an electrical signal converted from the back reflected light. The light receiving unit 200 includes a light receiving lens 210, a band transmission filter 220, a light receiving element 230 and an amplifier 240. This allows the light receiving lens 210 of the light receiving unit 200 to have a different optical axis from that of the object lens 110 of the light transmission unit 100.

Behind the light receiving lens 210, the band transmission filter 220 and the light receiving element 230 are arranged in sequence. The band transmission filter 220 allows a light of a narrow wave length band including the measurement light to be transmitted and blocks or attenuates a light of other bands. Examples of the light receiving element 230 are photodiodes, phototransistors and the like which are sensitive to a band of the measurement light. This allows the light receiving element 230 to output a light receiving signal which corresponds to an intensity of the incident light. In terms of eliminating influences of a background light on the measurement light, it is preferable that the light receiving element 230 has a smaller light receiving area.

In the tight receiving unit 200 described above, a light beam $C_1$, which is reflected or scattered on a target positioned anterior to the range finder 10, enters the light receiving lens 210. The light beam $C_1$ is collected in the light receiving lens 210, and after passing through the band transmission filter 220 as a light beam $C_2$, is received in the light receiving element 230. The light receiving element 230 outputs to the amplifier 240 a light receiving signal which corresponds to the received intensity. The amplifier 240 amplifies the light receiving signal supplied from the light receiving element 230. The amplifier 240 supplies the amplified light receiving signal to the computation unit 300.

The computation unit 300 computes a distance to the target based on the light receiving signal output by the light receiving unit 200. Specifically, a temporal difference between a time at which the light emitting unit 130 emits the measurement light and a time at which the light receiving element 230 receives a back reflected light of the measurement light reflected on the target is measured. The computation unit 300 computes the distance to the target based on the measured temporal difference.

The computation unit 300 determines whether the light receiving signal exceeds a predetermined threshold. Here, the threshold is a value for distinguishing a signal based on the measurement light from noise signals based on solar lights and the like. The computation unit 300 calculates, if it determines that the light receiving signal exceeds the threshold, a temporal difference between a transmission time of a pulse of the measurement light which corresponds to the light receiving signal and a receiving time of the light receiving signal. The computation unit 300 further integrates a count value in a memory address of the memory 500 which corresponds to the temporal difference. In light receiving signals for one pulse of the measurement light, if a plurality of portions exceed the threshold, the count value is integrated in the memory address which corresponds to the temporal difference for each of the portions. By setting the intensity of the measurement light and the threshold described above as appropriate, influences of the background light is reduced and a reflected light or a scattered light which is the measurement light reflected or scattered on the target (which may be referred to as a reflected light and the like in the following description) can be detected as the light receiving signal of the measurement light. Note that the temporal difference described above may be calculated by using either edge sampling or level sampling.

The computation unit 300 converts the temporal difference to a distance by the expression described below:

$$d = c \times t / 2$$

where, d is the distance to the target, c is the light speed, and t is the temporal difference, The computation unit 300 converts the measured temporal difference to the distance to generate a histogram in which the distance is represented with bins.

The memory 500 records the intensity of the current measurement light, information of a range of ranging errors described below and the like, in addition to the count value described above. in the following description, driving the light transmission unit 100 to output the measurement light, obtaining the count value described above and recording it in the memory 500 may be referred to as collecting light transmission and receiving data.

The determination unit 400 detects a peak of a mountain in a histogram of distance bins which is generated by the computation unit 300 and identifies the distance to the peak position as the distance to the target. Here, the mountain refers to, in the histogram with a vertical axis of a frequency and a horizontal axis of bins, a portion which is continuous in the horizontal axis direction while exceeding a predetermined threshold of the frequency.

The determination unit 400 displays the identified measured distance on the reticle plate 140. This allows information of the measured distance computed by the computation unit 300 to be superimposed on an image of the measurement target observed by a user through the eye lens 150.

In this case, the determination unit 400 determines, based on the relation between the information about a timing at which the light receiving unit 200 receives the back reflected light and the information about the intensity of the light receiving signal, which light receiving signal is used for computation and/or display, or which light receiving signal is not used for computation and/or display. In the determination described above, the relation between a tinting at which the light receiving unit 200 receives the back reflected light and the intensity distribution of the light receiving signals may also be used. Hereinafter, an example is described of determining, based on the relation between the information about the light receiving timing and the information about the intensity of the light receiving signal, whether the light receiving signal at the timing of receiving the back reflected light indicates the back reflected light from fogs or mists, and not using the light receiving signal at the timing of receiving if it is determined to be the one from fogs or mists.

Figure 2:
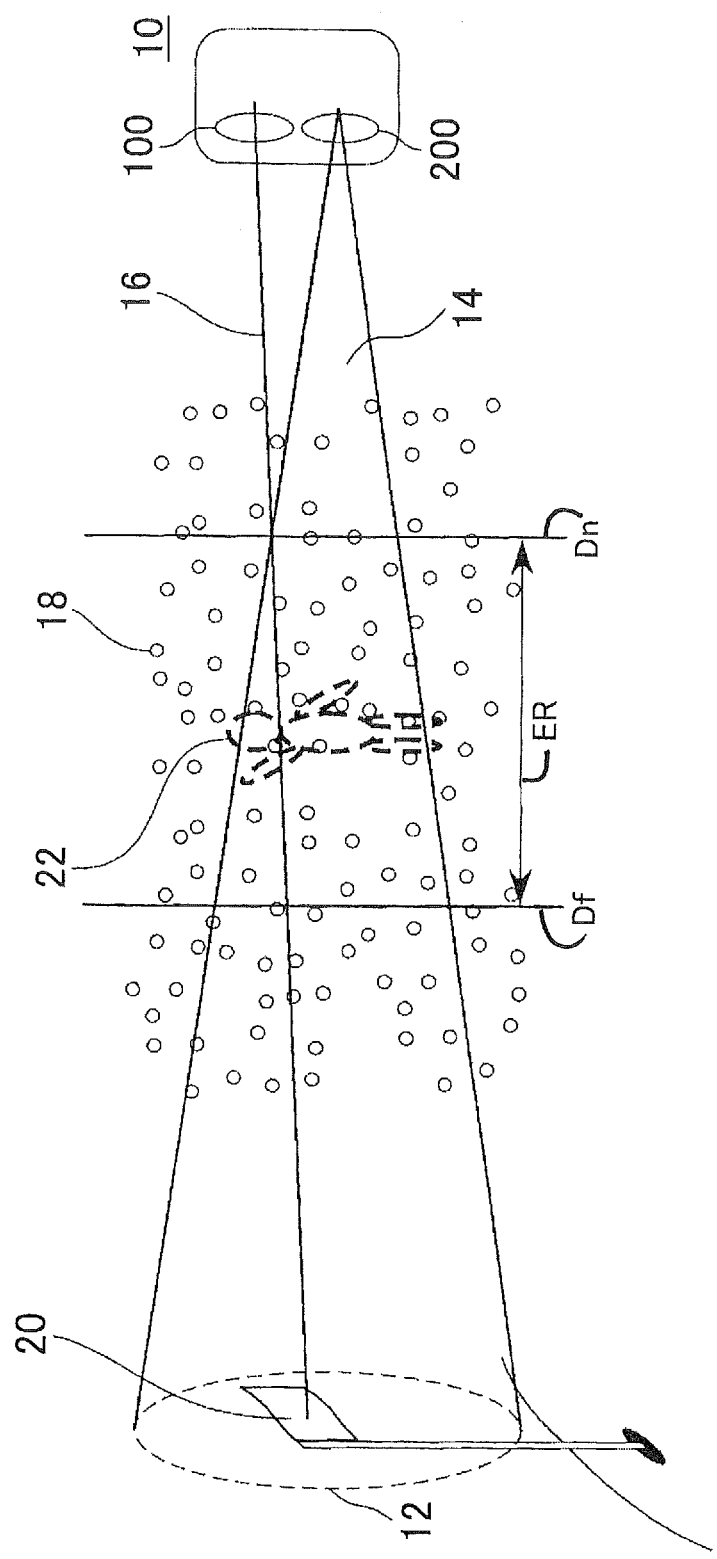
FIG. 2 is a diagram illustrating an occurrence principle of ranging error due to fogs or mists.

FIG. 2 is a diagram illustrating an occurrence principle of ranging error due to fogs or mists. Here, fogs or mists include so-called aerosols in general meanings, such as fogs, mists, and smoke fogs.

FIG. 2 schematically shows a situation in which the distance to a distant target 20 is measured with the range finder 10. A light receiving solid angle 14 is a visual solid angle at which the light can be taken in to the light receiving unit 200. The light receiving region 12 is a range capable of light receiving at a distance corresponding to the distant target 20, based on the light receiving solid angle 14.

The range finder 10 takes in to the light receiving unit 200, for example, the reflected light such as the measurement light 16 reflected on an object such as the measurement target within the light receiving solid angle 14 to measure the distance to the object. Therefore, the range finder 10 can measure the distance to the object positioned more distant than Dn at which the measurement light 16 and a region formed by the light receiving solid angle 14 are intersected.

In FIG. 2, the measurement light 16 is irradiated toward the distant target 20 from the light transmission unit 100. Here, given that fogs or mists do not occur, the measurement light 16 is, for example, reflected on the distant target 20, and takes in to the light receiving unit 200. The range finder 10 calculates the distance to the distant target 20 from the temporal difference between the output time of the measurement light 16 and the receiving time.

A case is now considered in which fogs or mists occur between the range finder 10 and the distant target 20. The measurement light 16 is scattered due to fog or mist particles 18 when it is propagated through fogs or mists.

If fogs or mists occur in a range between the range finder 10 and the distance Du, the light path of the measurement light 16 within the range is not included in the region formed by the light receiving solid angle 14. Therefore, a backscattered light due to the fog or mist particles 18 does not enter the light receiving unit 200, or even if it enters, it is so weak that the light receiving signal does not exceed the threshold to he counted.

If fogs or mists occur in a range more distant than the distance Dn, the light path of the measurement light 16 in the range is included within the region formed by the light receiving solid angle 14 so that the backscattered light due to the fog or mist particles 18 is detected by the light receiving unit 200. Here, the intensity of the reflected light from the object is varied depending on the distance from the object. The scattered light due to fogs or mists more distant than the distance Df is attenuated before it is taken in to he light receiving unit 200 and is not counted.

On the other hand, if fogs or mists occur in a range from the distance Dn to the distance Df, the range finder 10 counts the backscattered light due to the fog or mist particles 18. As a result, an erroneous measurement result is output as if a close-range target 22 exists.

Based on the situation described above, the determination unit 400 of the present embodiment determines, based on the relation between the timing at which the light receiving unit 200 receives the back reflected light and the light receiving signal, which receiving signal is used for display, or which receiving signal is not used for display.

One example of the predetermined range is a range of ranging errors ER which is a range from the distance Dn to the distance Df. The distance Dn is calculated in advance from the relation among, for example, an optical axis of the light transmission unit 100, a solid angle of a beam expansion, the light receiving solid angle 14 of the light receiving unit 200. Similarly, the distance Df is calculated in advance, instead of or in addition to them, based on a sensitivity of the light receiving element 230 and the like, information of the range of ranging errors ER based on these distances Dn, Df is recorded in the memory 500 in advance.

Figure 3:
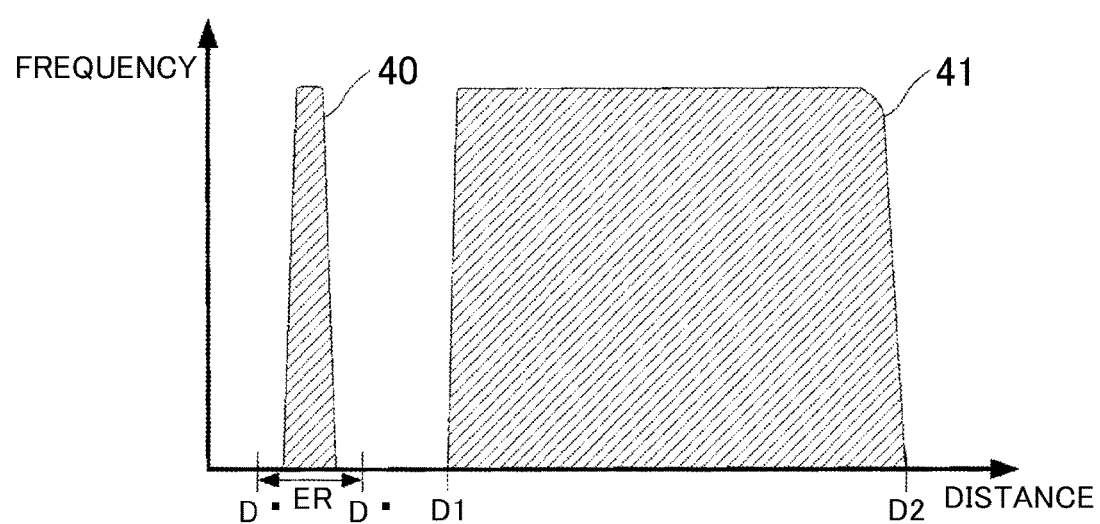
FIG. 3 is a diagram showing a typical histogram for a close-range target.
Figure 4:
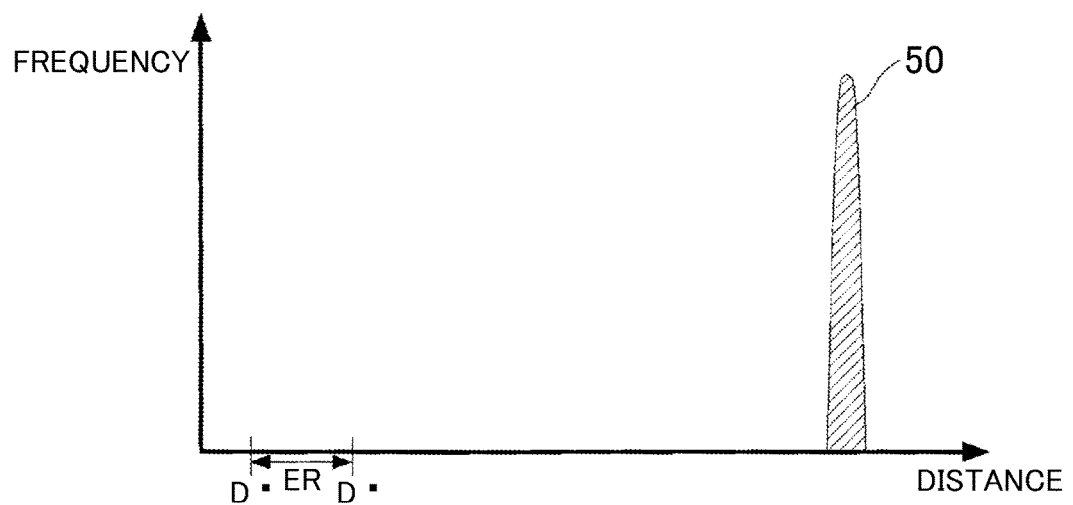
FIG. 4 is a diagram showing a typical histogram for a distant target.
Figure 5:
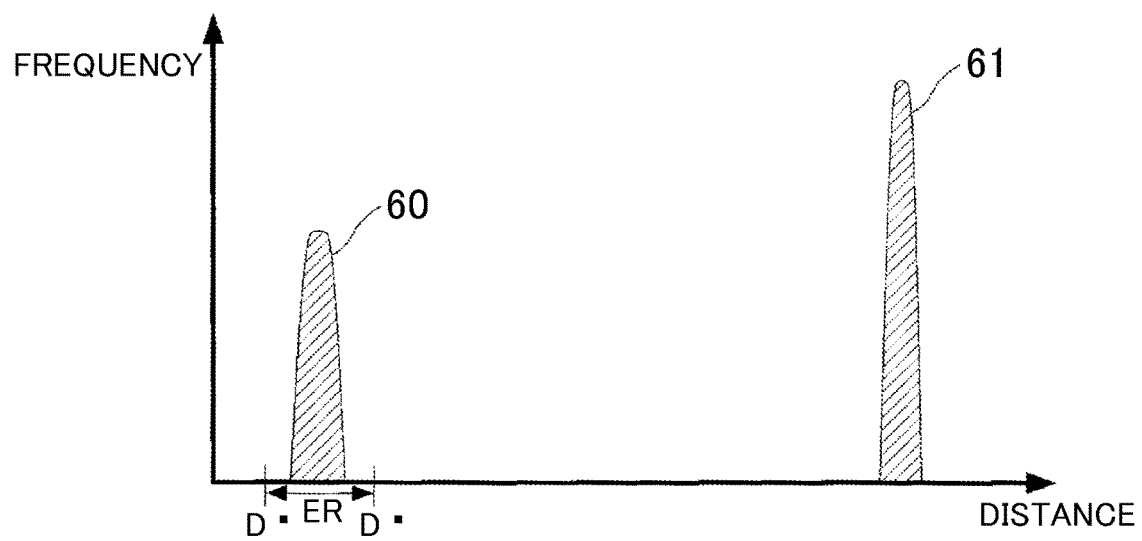
FIG. 5 is a diagram showing a typical histogram for a distant target when fogs or mists occur.

FIGS. 3 to 5 show examples of the histograms generated by the range finder 10. The vertical axis of each histogram indicates a frequency. The horizontal axis indicates a distance which is larger at the righter side. Note that the frequency distribution is shaped to correspond to the relation between the intensity of the light receiving signal itself and the distance.

FIG. 3 is a diagram showing a typical histogram for a close-range target. For example, it is a histogram of the distance to the target below 10 m. There exists a closer-range mountain 40 within the range of ranging errors ER. At a more distant side than the mountain 40, there exists a wide mountain 41 having a width between distances D1 and D2.

If the target is at a position close to the range finder 10, the reflected light from the target is not attenuated so that it has a relatively high intensity. If the light having a high intensity enters the light receiving element 230, the light receiving element 230 outputs the light receiving signal having a high voltage to the amplifier 240. If the voltage of a specified value or above is input to the amplifier 240, the amplifier 240 is saturated so that a false signal is generated and counted. The wide mountain 41 is fouled due to the false signal generated by this saturation of the amplifier 240.

On the other hand, if the light having a low intensity enters the light receiving element 230, the light receiving element 230 outputs the light receiving signal having a low voltage to the amplifier 240. If the voltage below the specified value is input to the amplifier 240, the false signal is not generated. Therefore, a wide mountain does not appear in the histogram.

FIG. 4 is a diagram showing a typical histogram for a distant target. For example, it is a histogram of the distance to the target of 100 m or above. A more-distant mountain 50 exists at a more distant side than in FIG. 3. The reflected light from the target in FIG. 4 is sufficiently attenuated before it enters the light receiving unit 200. Therefore, the amplifier 240 is not saturated and a wide mountain does not appear.

FIG. 5 is a diagram showing a typical histogram for a distant target when fogs or mists occur. For example, it is a histogram of the distance to the target of 100 m or above. In FIG. 5, a closer-range mountain 60 in the range of ranging errors ER and a more-distant mountain 61 appear.

in FIG. 5, if the mountain 60 is formed based on the reflected light from the close-range target, it is expected that the wide mountain 41 illustrated in FIG. 3 is included. However, the wide mountain is not included in FIG. 5. Therefore, it can be determined that the closer-range mountain 60 is an element of a ranging error due to fogs or mists. Therefore, the more-distant mountain 61 can be identified to he the distance to the target.

That is, whether the wide mountain 41 described above appears or not is determined based on whether fogs or mists occur or not. More specifically, it is determined whether or not a distribution is included in a region more distant than the range of ranging errors ER which is generated if fogs or mists do not occur. Based on the determination, it is determined whether the closer-range mountain 60 is displayed or not. This can prevent the distance calculated due to fogs or mists from being incorrectly displayed as the distance to the target.

Figure 6:
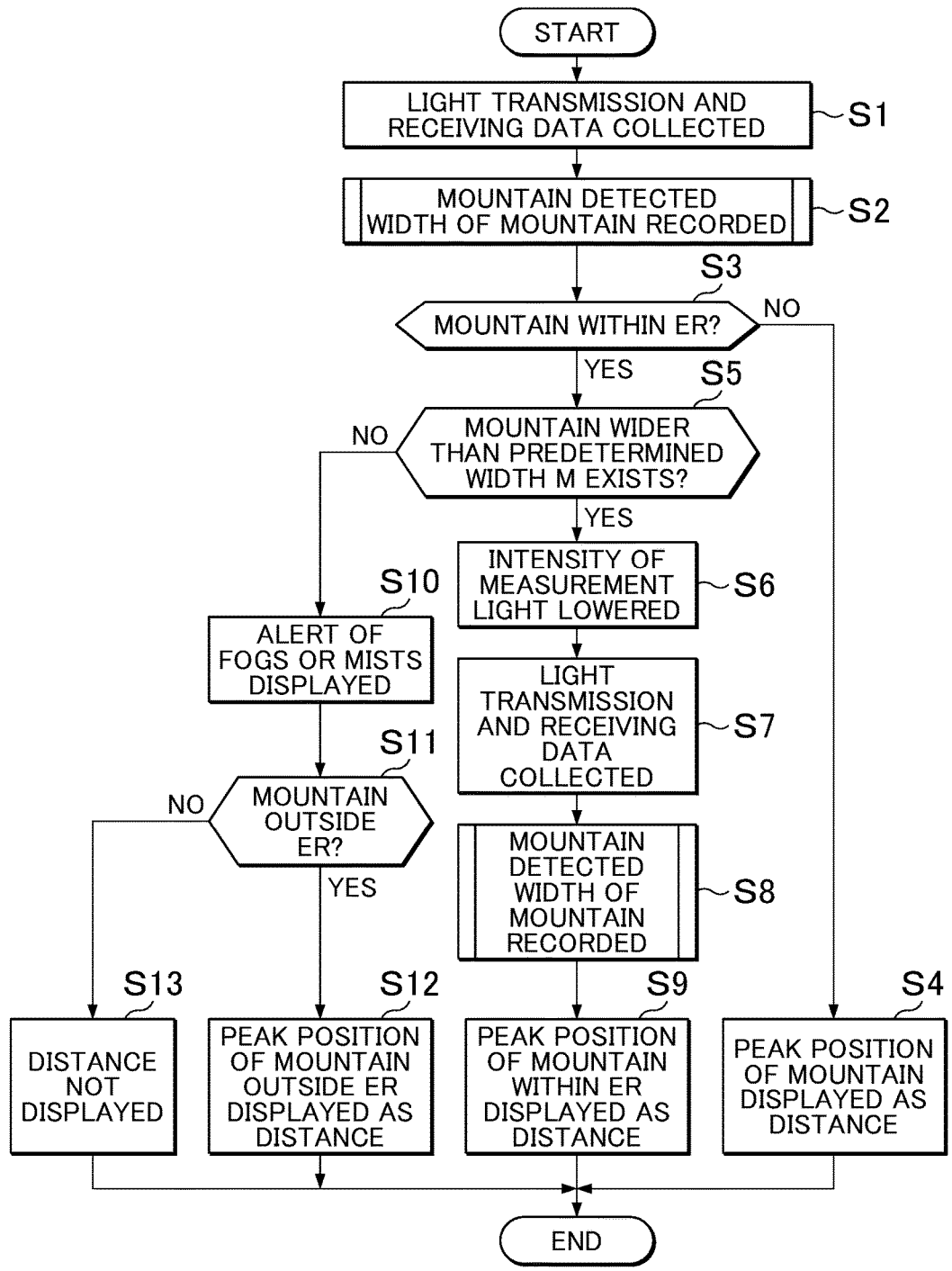
FIG. 6 is a flow chart of a ranging error avoiding process.

FIG. 6 is a flow chart of a ranging error avoiding process. This flow is started when a manipulation button 510 is pressed down by a user and the computation unit 300 receives a ranging start signal.

If the computation unit 300 detects that the manipulation button 510 is pressed down by a user, it collects light transmission and receiving data to generate a histogram (S1). The determination unit 400 causes the measurement light having a predetermined intensity which is higher than usual to be output, detects a mountain in the histogram and record a width of the mountain (S2). Here, one example of the predetermined intensity is an intensity of the measurement light which is determined to result in a false signal if the target is provided within the range of ranging errors ER, and is stored in the memory in advance.

The determination unit 400 determines whether the detected mountain exists within the range of ranging errors ER (S3). If the detected mountain is determined not to be within the range of ranging errors ER (S3: NO), the determination unit 400 displays the distance to a peak position of the detected mountain on the reticle plate 140 as a ranging result (S4).

In the step S3, if the detected mountain is determined to be within the range of ranging errors ER (S3: YES), the determination unit 400 determines whether a mountain wider than a predetermined width M is included at the more-distant side (S5). In the step S5, if the mountain wider than the predetermined width M is determined to be included at the more-distant side (S5: YES), the determination unit 400 lowers the intensity of the measurement light to the intensity as usual (S6). When the frequency of the mountain within the range of ranging errors ER is saturated for the measurement light having a high intensity, saturation can be prevented by lowering the intensity of the measurement light, thereby readily detecting the peak. The determination unit 400 discards data of the histogram recorded in the memory 500. Next, the computation unit 300 collects the light transmission and receiving data again to generate the histogram (S7). The determination unit 400 detects a mountain in the histogram and records a width of the mountain (S8). Then, the determination unit 400 displays on the reticle plate 140 the distance to a peak position of the mountain which is determined to be included in the range of ranging errors ER, as the distance to the target (S9).

In the step if the mountain wider than the predetermined width M is determined to be not included at the more distant side (S5: NO), the determination unit 400 determines that fogs or mists occur and alerts the user that fogs or mists occur (S10). For example, the determination unit 400 displays an alert on the reticle plate 140 to call an attention to occurrence of fogs or mists.

Following the step S10 described above, the determination unit 400 determines whether a mountain also exists outside the range of ranging errors ER (S11). If the mountain is also determined to exist outside the range of ranging errors ER (S11: YES), the determination unit 400 displays a distance to a peak position of the mountain outside the range of ranging errors ER on the reticle plate 140 as the distance to the target (S12). On the other hand, if the mountain is determined not to exist outside the range of ranging errors ER in the step S11 (S11: NO), the determination unit 400 does not display the distance on the reticle plate 140 (S13).

After any of processes in the step S4, the step S9, the step S12, and the step S13 are performed, the flow is ended.

Figure 7:
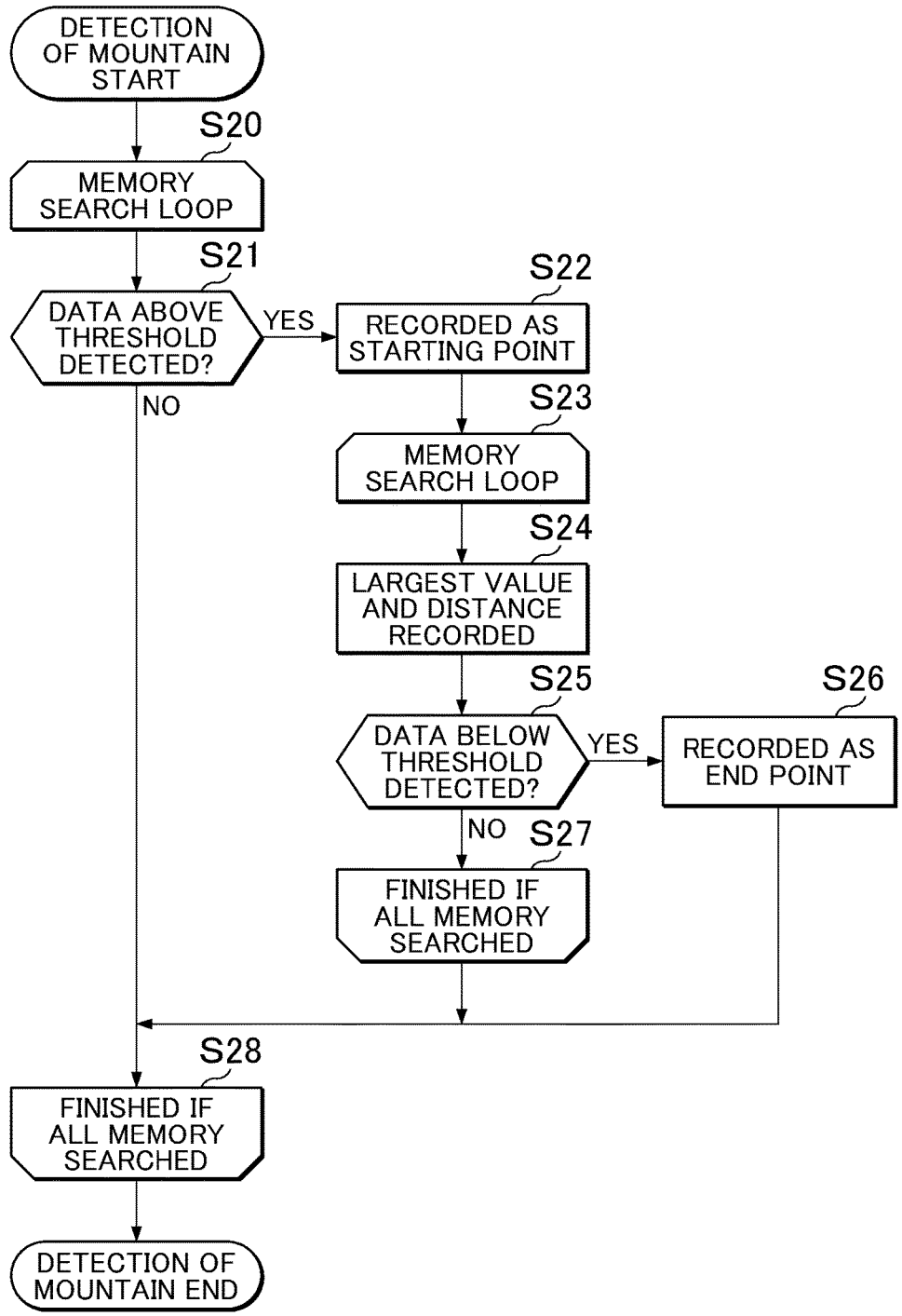
FIG. 7 is a flow chart for detecting a mountain in the histogram.

FIG. 7 is a flow chart for detecting a mountain in the histogram. This flow is started when the measurement lights are output by the computation unit 300 in number corresponding to one ranging operation.

The determination unit 400 reads frequencies from memory addresses sequentially in the order from a side of a smaller temporal difference to a side of a greater temporal difference (S20). The determination unit 400 determines whether the read frequency exceeds a predetermined frequency threshold (S21). If the read frequency is determined not to exceed the predetermined frequency threshold (S21: NO), the determination unit 400 reads a frequency from a next memory address. The determination unit 400 repeats the reading operation until it reads the frequency which exceeds the predetermined frequency threshold.

In the step S21 if the read frequency from the memory address is exceeds determined to the predetermined frequency threshold (S21: YES), the determination unit 400 records in the memory 500 information of the distance corresponding to the memory address, as a starting point of the mountain (S22). The determination unit 400 reads the frequencies from the memory addresses sequentially in the order from a position determined as the starting point of the mountain in the step S22 toward a side of greater temporal differences (S23). The determination unit 400 determines whether the read frequency from the memory address is below the predetermined frequency threshold (S24).

In the step S24, if it is determined that the read frequency from the memory address is not below the predetermined frequency threshold (S24: NO), the determination unit 400 reads a frequency from a next memory address. The determination unit 400 repeats the reading operation until it reads the frequency below the predetermined frequency threshold. In this operation, the determination unit 400 records in the memory 500 the largest value of the read frequencies and the distance corresponding to the memory address (S24).

In the step S24, if it is determined that the read frequency from the memory address is below the predetermined frequency threshold (S24: YES), the determination unit 400 records information of the distance corresponding to the memory address in the memory 500, as an end point of the mountain (S26). According to the operations described above, the position of the mountain in the histogram, and the distance to the peak position and the width of the mountain are recorded in the memory 500.

The determination unit 400 continues to search the remaining memory addresses for the mountain. When the frequencies are read from all of the memory addresses (S28), the determination unit 400 finishes searching for the mountain. According to the operations described above, ail of the mountains in the histogram can be detected.

Figure 8:
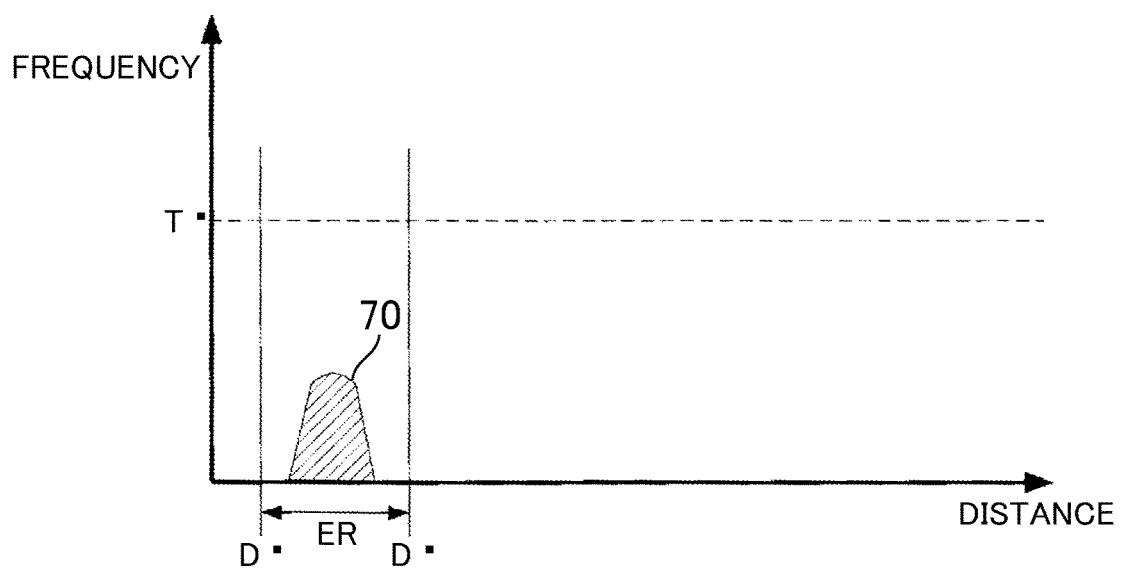
FIG. 8 is a diagram illustrating another determination method.
Figure 9:
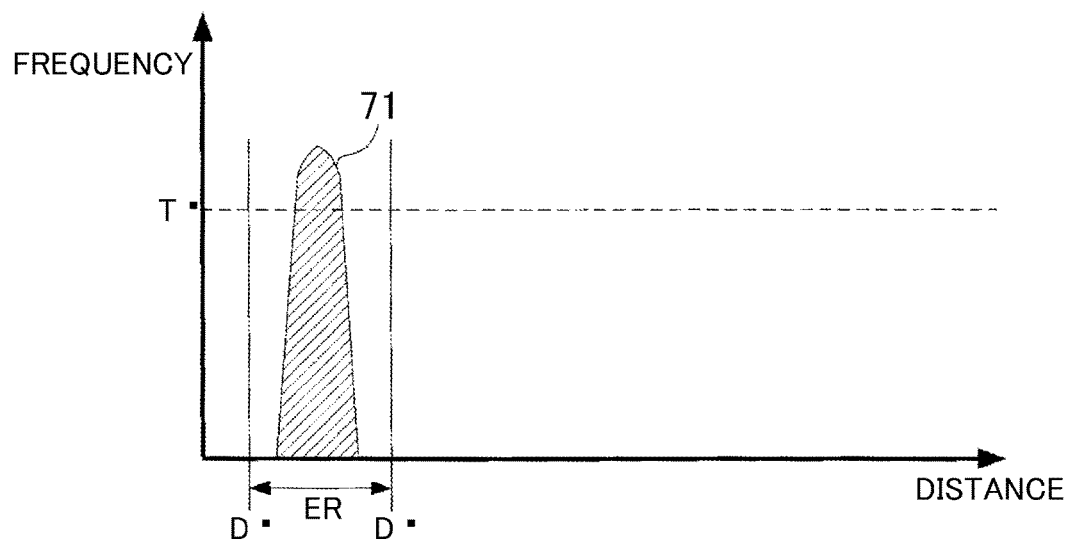
FIG. 9 is a diagram illustrating another determination method.
Figure 10:
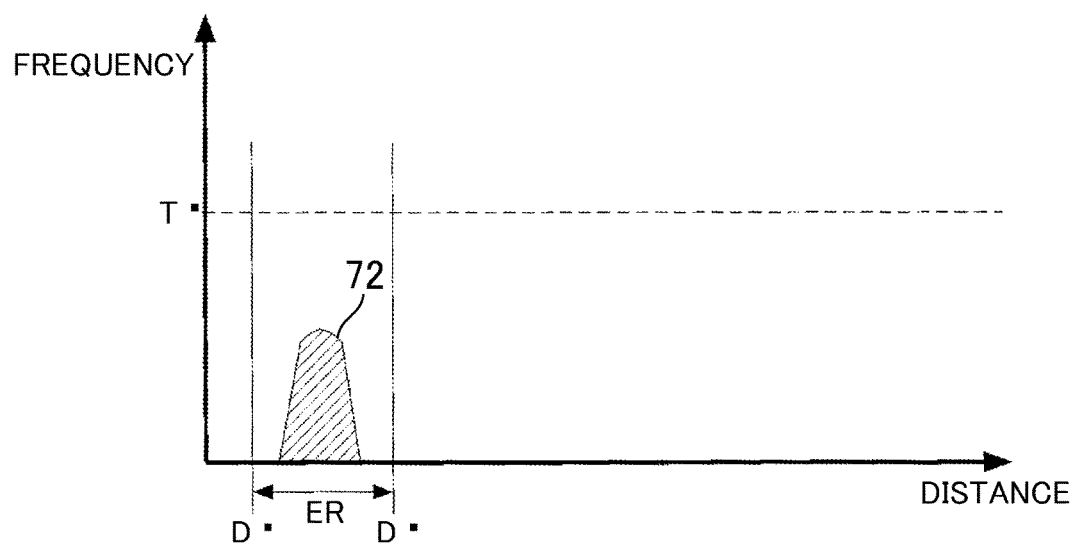
FIG. 10 is a diagram illustrating, another determination method.

FIGS. 8 to 10 are diagrams illustrating another determination method. FIG. 8 shows the histogram generated with the measurement light of certain intensity. FIG. 8 indicates that a closer-range mountain 70 does not exceed a predetermined threshold Th.

FIGS. 9 and 10 show the histograms generated with the measurement light having a higher intensity than in FIG. 8. FIG. 9 indicates that a closer-range mountain 71 exceeds the predetermined threshold Th. On the other hand, FIG. 10 indicates that a closer-range mountain 72 does not exceed the predetermined threshold Th.

Because fogs or mists have depths, the scattered light from fogs or mists has a larger distance distribution than the reflected light from the target. Therefore, the light receiving signal for the scattered light from fogs or mists tends to be broader than the light receiving signal for the reflected light from the target. Also, the scattered light from fogs or mists has a lower intensity than the reflected light from the target. Therefore, the rate of the light receiving signals for the scattered lights from fogs or mists which do not exceed the threshold and are not counted is higher than that of the light receiving signals for the reflected lights from the target. Therefore, if the mountain within the range of ranging errors ER is formed based on the scattered light from fogs or mists, it is difficult to drastically increase a height of the mountain even if the intensity of the measurement light is increased. In contrast, if it is formed based on the reflected light from the target, it is possible to drastically increase a height of the mountain if the intensity of the measurement light is increased.

Therefore, it is determined whether a predetermined condition is met, that is, whether the frequency of the mountain in the range of ranging errors ER exceeds a predetermined frequency threshold Th. In this case, instead of the step S5 in FIG. 6, if the determination in the step S3 is YES and the height of the mountain positioned within the range of ranging errors ER for the measurement light having the predetermined intensity exceeds the predetermined threshold frequency Th, the determination unit 400 determines that the mountain is not formed due to fogs or mists. On the other hand, if the height of the mountain positioned within the range of ranging errors ER does not exceed the predetermined frequency threshold Th, the determination unit 400 determines that the mountain is formed due to fogs or mists.

This allows, in case of FIG. 9, the determination unit 400 to determine that the closer-range mountain 71 is a mountain corresponding to the target positioned at the distance and display the distance. On the other hand, in case of FIG. 10, the determination unit 400 determines that the closer-range mountain 72 is formed due to fogs or mists and does not display the distance.

Figure 11:
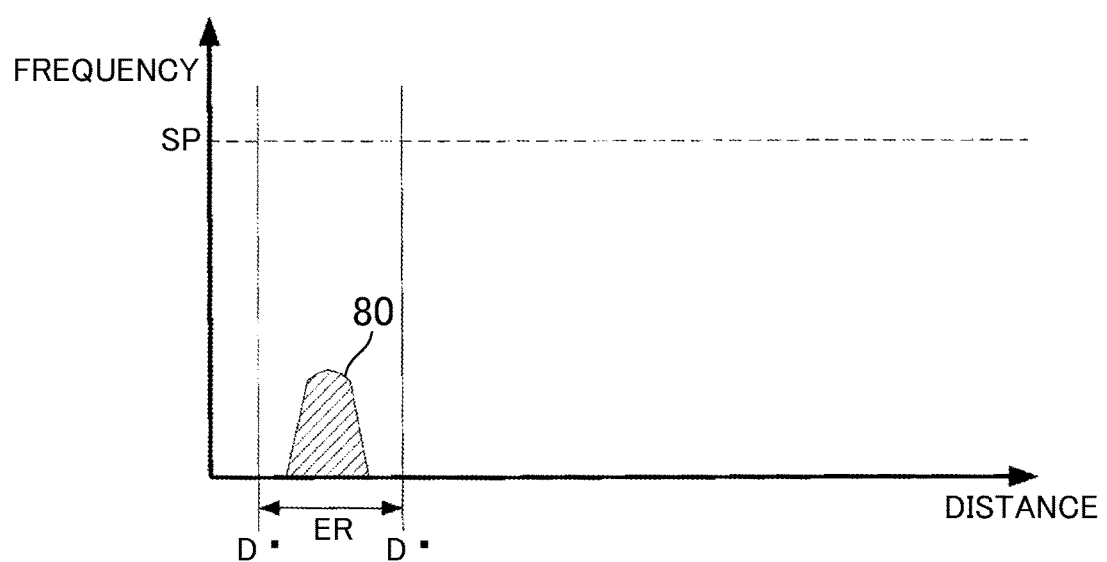
FIG. 11 is a diagram illustrating still another determination method.
Figure 12:
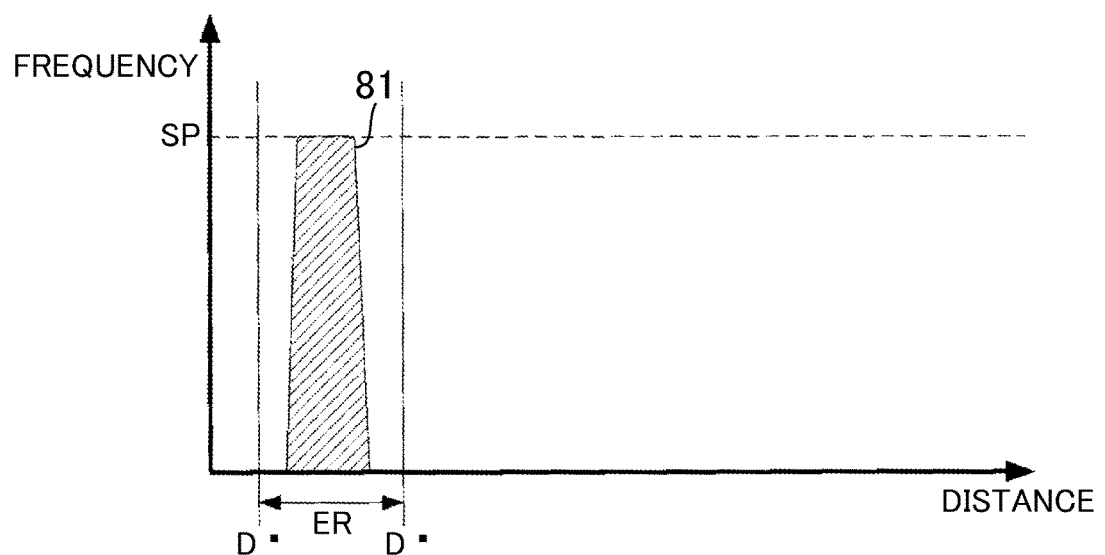
FIG. 12 is a diagram illustrating still another determination method.
Figure 13:
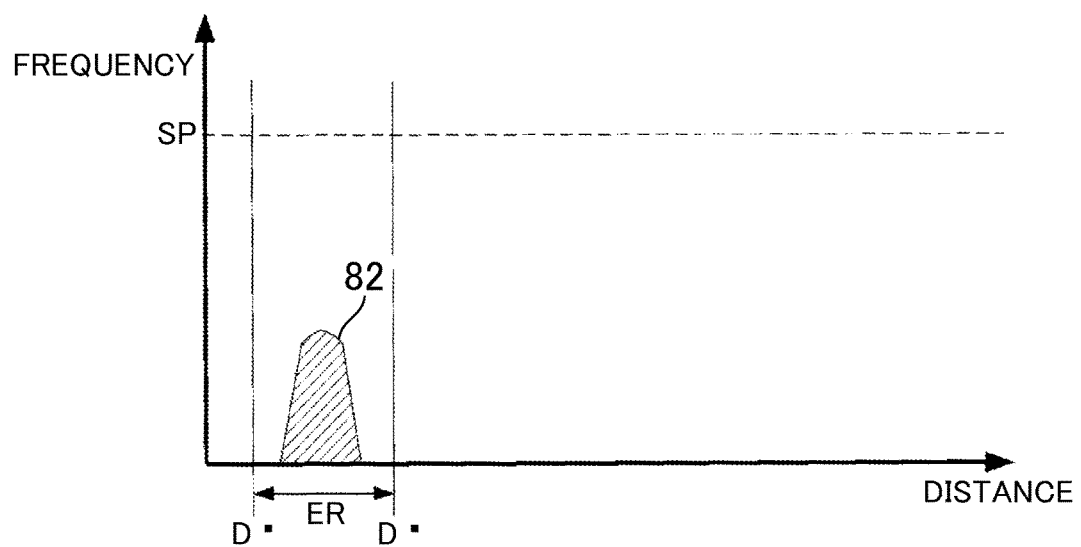
FIG. 13 is a diagram illustrating still another determination method.

FIGS. 11 to 13 are diagrams illustrating still other determination methods. FIG. 11 indicates that a closer-range mountain 80 does not reach a saturation point SP.

FIGS. 12 and 3 show the histograms generated with the measurement light having a higher intensity than in FIG. 11. FIG. 12 indicates that a closer-range mountain 81 reaches the saturation point SP. On the other hand, FIG. 13 indicates that a closer-range mountain 82 does not reach the saturation point SP.

Instead of the example shown in FIG. 8, it is determined whether the frequency of the mountain positioned within the range of ranging errors ER is saturated, that is, whether it reaches a predetermined saturation point SP of the frequency. In this case, instead of the step S5 in FIG. 6, if the determination in the step S3 is YES and the mountain positioned within the range of ranging errors ER for the measurement light having the predetermined intensity reaches the predetermined saturation point SP, the determination unit 400 determines that the mountain is not formed due to fogs or mists. On the other hand, if the mountain positioned within the range of ranging errors ER does not reach the predetermined saturation point SP, the determination unit 400 determines that the mountain is formed due to fogs or mists.

This allows, in case of FIG. 12, the determination unit 400 to determine that the closer-range mountain 81 is a mountain corresponding to the target positioned at the distance and display the distance. On the other hand, in case of FIG. 13, the determination unit 400 determines that the closer-range mountain 82 is formed due to fogs or mists and does not display the distance.

Figure 14:
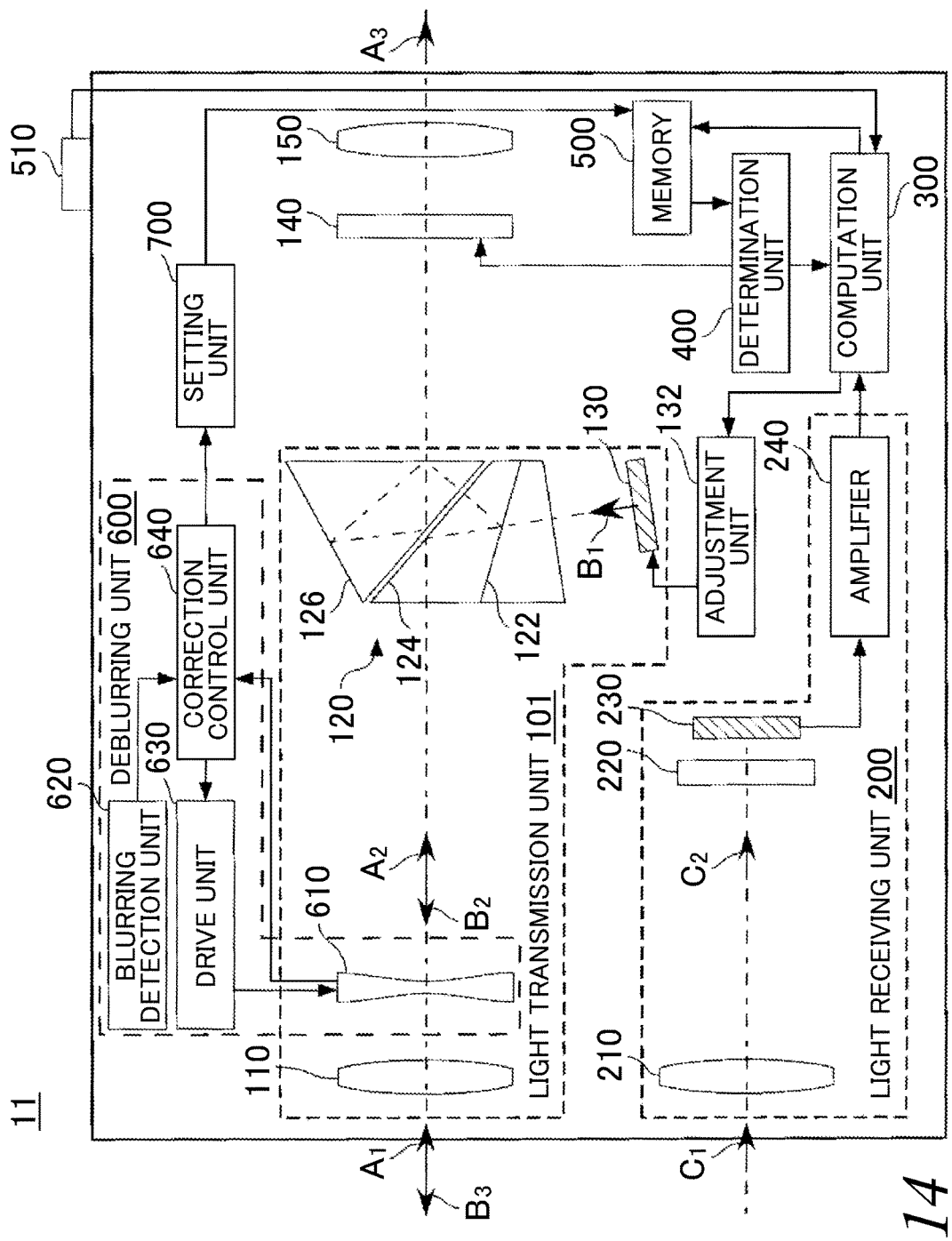
FIG. 14 is a block diagram of a range finder in a second embodiment.

FIG. 14 is a block diagram of a range tinder 11 in a second embodiment. Note that the same reference signs are applied to the same constituents as in the first embodiment, and the description is omitted.

The range finder 11 includes, in addition to the range finder 10 of the first embodiment, a deblurring unit 600 and a setting unit 700. The deblurring unit 600 includes a correction lens 610, a blurring detection unit 620, a drive unit 630, and a correction control unit 640. Further, the light transmission unit 101 includes a correction lens 610, in addition to the object lens 110, the erect prism 120 and the light emitting unit 130. The sighting unit also shares the correction lens 610.

The blurring detection unit 620 includes, for example, a plurality of angular velocity sensors of which detecting directions intersect one another. A plurality of angular velocity sensors are arranged, for example, in a direction to detect pitching and yawing of the range finder 10. If the range finder 10 is displaced, each of the angular velocity sensors output to the correction control unit 640 a signal corresponding to a displacement amount which includes information such as a direction and a magnitude.

The correction control unit 640 calculates, with reference to the output from the blurring detection unit 620 periodically, a correction amount of the optical axis of the light transmission unit 101 to negate blurring of an image generated in the sighting unit due to the displacement of the range finder 11. Correspondingly to the displacement amount, the correction amount also includes a direction and a magnitude. The correction control unit 640 calculates the displacement amount of the correction lens 610 to cause an optical axis displacement corresponding to the correction amount. Also, the correction control unit 640 outputs to the drive unit 630 an instruction to drive the correction lens 610 by the calculated displacement amount.

The drive unit 630 displaces the correction lens 610 in a direction which intersects the optical axis, based on the instruction received from the correction control unit 640. This can prevent the measurement light from deviating from the target, while suppressing blurring of the image in the sighting unit.

Furthermore, the correction control unit 640 obtains the displacement amount from the correction lens 610 to perform feedback control on the drive amount of the correction lens 610. This allows the position of the correction lens 610 to be controlled with a high accuracy, regardless of disturbance such as impacts and vibrations. Also, the correction control unit 640 calculates the correction amount from the displacement amount obtained from the correction lens 610 and transmits information of the correction amount to the setting unit 700.

Note that the deblurring unit 600 may perform the correction operation constantly, or may perform the correction operation only in a period when a user uses the range finder 11. Use of the range finder 11 by a user may also be determined, for example, based on detection of the user's eye looking into the eye lens 150 to set the deblurring unit 600 ON/OFF. Also, a user's manipulation on a switch and the like may cause the deblurring unit 600 to start operations. Furthermore, if there are no user's manipulations over a predetermined time, the operations of the deblurring unit 600 may also be stopped.

The correction lens 610 is driven by the drive unit 630 in the vicinity of the object lens 110 to displace each of the light paths of the light beam $A_2$, $B_2$. This allows the correction lens 610, if the range finder 11 is displacement, to be displaced to optically negate the displacement of the range finder, thereby stopping blurring of the image subject to a user's observation. Because the correction lens 610 is also shared in the light transmission unit 101, the range finder 11 can continue to irradiate the measurement light to the same target even if it is displaced.

The setting unit 700 receives the correction amounts from the correction control unit 640 at predetermined timings and sets the range of ranging errors ER based on the correction amounts. The setting unit 700 rewrites a value of the range of ranging errors ER recorded in the memory 500 with a newly calculated value as appropriate.

Figure 15A:
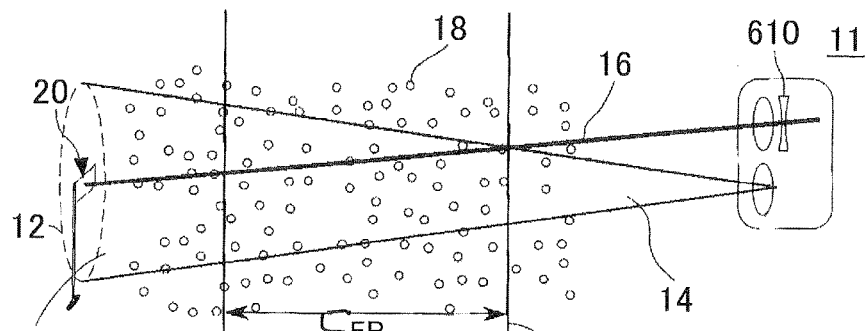
FIGS. 15(a)-15(c) are diagrams illustrating variations in a range of ranging errors ER at correction of hand movements.
Figure 15B:
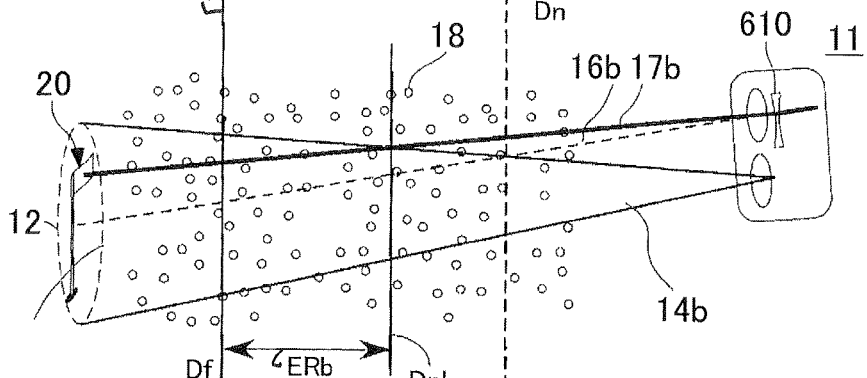
Figure 15C:
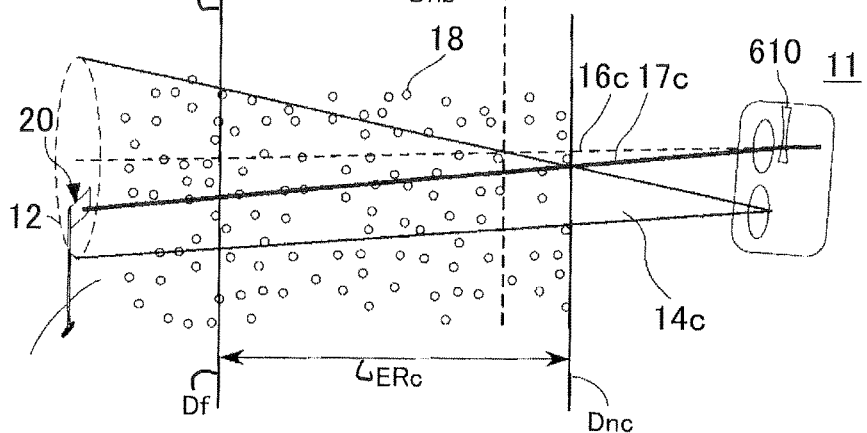

FIGS. 15(a)-15(c) are diagrams illustrating variations in a range of ranging errors at correction of hand movements. Note that if elements are the same as those in FIG. 2, the same reference signs are applied to the elements and the descriptions are omitted.

FIG. 15(a) shows the ranging operation by the range finder 10 without hand movements. The correction lens 610 is arranged at an initial position. Based on the relation between the measurement light 16 and the light receiving solid angle 14, the range of ranging errors ER is defined by a proximal end Dn and a distal end Df.

FIG. 15(b) shows a state of the range finder 10 in which pitching of a minor angle occurs against the gravity center in a counterclockwise direction. The correction lens 610 is driven to correct a displacement of a sighting position due to hand movements. Along with the displacement of the correction lens 610, a pre-correction measurement light 16b is corrected to a post-correction measurement light 17b and sighted at the same position as in FIG. 15(a). In this case, a position Dnb at which the light receiving solid angle 14b and the post-correction measurement light 17b intersect is displaced to a more distant side than a position Dn at which the light receiving solid angle 14 in FIG. 15(a) and the post-correction measurement light 16 intersect.

FIG. 15(c) shows a state of the range finder 10 in which pitching of a minor angle occurs against the gravity center in a direction opposite to FIG. 15(b), that is, in a clockwise direction. Similar to FIG. 15(b), a pre-correction measurement light 16c is corrected to a post-correction measurement light 17c by the correction lens 610, and is sighted at the same position as in FIG. 15(a), In this case, a position Dnc at which the light receiving solid angle 14c and the post-correction measurement light 17c intersect is displaced to a closer range side than a position Dn at which the light receiving solid angle 14 in FIG. 15(a) and the post-correction measurement light 16 intersect.

The setting unit 700 sets, if correction is performed by the correction lens in one ranging operation, a range of Dnc to the distal end Df as the range of ranging errors ER in the ranging operation, where Dnc is the most closest-range position to which the intersection position described above is displaced in the one ranging operation. This can further reduce detection errors due to fogs or mists in one ranging operation. Note that, instead of this process, the setting unit 700 may also sets, if correction is performed by the correction lens in one ranging operation, a range of the average value of the intersection positions described above in the one ranging operation to the distal end Df, as the range of ranging errors ER in the ranging operation.

In the second embodiment, the deblurring unit 600 is provided only in the light transmission unit 100. However, the deblurring unit 600 may also he provided in the light receiving unit 200. Also, it may be provided both in the light transmission unit 100 and the light receiving unit 200.

In the second embodiment, the flow of the angina error avoiding process described with reference to FIGS. 6, 7 may be applied. Here, as described with respect to FIGS. 15(a)-15(c), the range of ranging errors ER is varied along with the &bluffing operation. Therefore, in the step S3 in FIG. 6, determination is performed with the range of ranging errors ER changed in accordance with the hand movement amount.

As another example of controlling the computation unit 300 by the determination unit 400 based on whether the relation between the timing at which the light receiving unit 200 receives the back reflected light and the light receiving signal fulfills a predetermined condition, the determination unit 400 may change a threshold used by the computation unit 300 to count the receiving signals based or the timing at which the back reflected light is received. Specifically, the threshold for the time zone which corresponds to the light receiving time from the range of ranging errors ER may also be controlled so that it is set to a value higher than the thresholds for other time zones. This allows weak light receiving signals due to the scattered light from fogs or mists not to be counted in an active manner, thereby readily avoiding ranging errors.

In the description above, the ranging error is determined based on the histogram. However, the ranging error may also be determined based on the light receiving signal, in this case, the voltage of the light receiving signal may be used as the determination standard, instead of the frequency. In ranging of a close-range target, the light receiving signal forms a wave form similar the histogram in FIG. 3. Therefore, in case of the light receiving signal, the ranging error avoiding process equivalent to the flow in FIG. 6 can also be achieved based on whether a wide mountain indicating false signals exists or not. Also, in FIGS. 6, 7, if the intensity of the measurement light is increased, the behavior of the light receiving signal is similar to the behavior of the histogram. Therefore, the similar ranging error avoiding process can be achieved by using the light receiving signal. Furthermore, similarly in the determination methods illustrated in FIGS. 8 to 13, determination may also be performed based on the voltage of the light receiving signal.

Note that in FIG. 1 and FIG. 14 described above, the object lens 110, the eye lens 150 and the light receiving lens 210 are illustrated by one representative lens. However, these lenses may also include a plurality of lenses.

Further, the object lens 110, the eye lens 150 and the light receiving lens 210 may also have variable focal distances, respectively. In this case, by varying the focal distances of at least the object lens 110 and the light receiving lens 210, the intersection position described above is varied. Therefore, the range of ranging errors ER may also be set depending on the focal distances.

Also, the steps S6 to S8 in FIG. 6 may also be omitted. In this case, the adjustment unit 132 may cause the light emitting unit 130 to constantly emit a light at the predetermined intensity described above. Also, the range finders 10, 11 may be provided with a selection switch to select and set a ranging error determination mode or an ordinary measurement mode, where the predetermined intensity described above is set if the ranging error determination mode is selected and an ordinary intensity is set if not.

Also, in the flow illustrated in FIG. 6, if the mountain is determined to exist within the range of ranging errors ER in the step S3 (S3: NO), it may also he determined whether the mountain outside the ER is saturated or not. The processes described in the steps S6 to S8 may be performed if the mountain is determined to be saturated. Also, similarly in the step S11, it may also be determined whether the mountain outside the ER is saturated or not. The processes described in the steps S6 to S8 may he performed if the mountain is determined to be saturated. This allows for easy detection of the peak of the mountain.

In the flow chart in FIG. 6, after the measurement light having a high intensity is output from the light transmission unit 100, the measurement light having a low intensity is output in the step S6. Instead of this process, after the measurement light having a low intensity is output from the light transmission unit 100, the measurement light having a low intensity may be output and light transmission and receiving data may be collected after the step S3: NO and the step S10, while omitting the steps S6 and S7.

In any of the embodiments described above, if fogs or mists are determined to exist, it is determined that the distance corresponding to fogs or mists is not displayed. Instead of this process, the receiving signal may be used for computation if fogs or mists are determine not to exist, while the receiving signal corresponding to fogs or mists may not be used for computation if fogs or mists are determined to exist.

Also, the light emitting unit 130 may also emit an ultraviolet light instead of an infrared light. In this case, the one which corresponds to an ultraviolet light is used as the erect prism 120.

Note that in the description above, a range finder of a so-called twin-lens type is described in which the light transmission unit 100 and the sighting unit have the common optical axis. However, the similar process and control can be applied to a range finder of a so-called triple-lens type in which the light transmission unit 100, the light receiving unit 200 and the sighting unit have different optical axes, respectively.

Also, FIGS. 3 to 5 can be considered to show one example of a time sequence pattern of the frequency distribution of the receiving signals. Therefore, based on the time sequence pattern, a range of the light receiving signals used for computation and/or display, or used for computation and/or display may also be controlled. Instead of the time sequence pattern of the frequency distribution of the receiving signals, the control described above may also be performed based on the time sequence pattern of the intensities of the receiving signals. The embodiment in FIG. 1 to FIG. 15(c) can also be applied to the case in which the time sequence pattern is used.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:
1. A distance detection apparatus comprising:
a detection unit which detects a time until when an output light is received by a light receiving unit;
a computation unit which computes a distance to a detection target by using the time detected by the detection unit;
an obtaining unit which obtains a predetermined range which is a range prone to a detection error due to a fog; and
a determination unit which determines whether the distance to the detection target computed by the computation unit is included in the predetermined range.

2. The distance detection apparatus according to claim 1, comprising a display unit which displays the distance to the detection target if the determination unit does not determine that the distance is included in the predetermined range, and which does not display the distance to the detection target if the determination unit determines that the distance is included in the predetermined range.

3. The distance detection apparatus according to claim 1, wherein
the detection unit detects a plurality of the times which correspond to a plurality of the output lights, respectively, and
the computation unit computes a frequency of a plurality of pieces of distance information by using a plurality of the times detected by the detection unit, and computes the distance by using the frequency of the distance information.

4. The distance detection apparatus according to claim 2, wherein if the distance to the detection target is included in the predetermined range, the display unit displays the distance when a frequency of the distance information is larger than a first predetermined value and does not display the distance when the frequency of the distance information is smaller than the first predetermined value.

5. The distance detection apparatus according to claim 2, wherein if the distance to the detection target is included in the predetermined range, the display unit does not display the distance when the light is output with a first intensity and when the light is output with a second intensity greater than the first intensity and a frequency of the distance information is smaller than a second predetermined value, and displays the distance when the light is output with the first intensity and the frequency of the distance information is smaller than the second predetermined value and when the light is output with the second intensity and the frequency of the distance information is larger than the second predetermined value.

6. The distance detection apparatus according to claim 1, comprising a display unit which displays an alert if the determination unit determines that the distance to the detection target is included in the predetermined range.

7. The distance detection apparatus according to claim 1, wherein the obtaining unit obtains the predetermined range determined based on at least one of a state of an optical system which allows the light to be transmitted therethrough and a sensitivity of the light receiving unit which receives the light.

8. An optical device comprising the distance detection apparatus according to claim 1.

9. An optical device comprising the distance detection apparatus according to claim 2.

10. An optical device comprising the distance detection apparatus according to claim 3.

11. An optical device comprising the distance detection apparatus according to claim 4.

12. An optical device comprising the distance detection apparatus according to claim 5.

13. An optical device comprising the distance detection apparatus according to claim 6.

14. An optical device comprising the distance detection apparatus according to claim 7.

* * * * *